United States Patent [19]

Yoder

[11] Patent Number: 4,500,132

[45] Date of Patent: Feb. 19, 1985

[54] TRAVEL TRAILER FRAME SUPPORT

[76] Inventor: Clarence T. Yoder, 11642 County Road 36, Goshen, Ind. 46526

[21] Appl. No.: 535,946

[22] Filed: Sep. 26, 1983

[51] Int. Cl.³ .............................................. B62D 39/00
[52] U.S. Cl. .................................... 296/171; 296/181; 296/188
[58] Field of Search .............. 296/181, 183, 187, 188, 296/170, 171, 172, 168; 52/73, 67

[56] References Cited

U.S. PATENT DOCUMENTS

| 2,813,747 | 11/1957 | Rice, Jr. | 296/171 |
| 2,820,666 | 1/1958 | Grochmal | 296/171 |
| 2,877,509 | 3/1959 | Klibanow | 296/171 |
| 4,108,326 | 8/1978 | Bertolini | 296/181 |

Primary Examiner—Robert R. Song
Attorney, Agent, or Firm—James D. Hall

[57] ABSTRACT

In a travel trailer having a floor, side and end walls, and a roof where the floor is supported by frame members. The trailer is provided with a frame support taking the form of a strap which is connected at one end to a rear end portion of the floor or frame members and which passes upwardly and forwardly along the roof of the trailer where its opposite end is connected to the roof. The purpose of the frame support is to prevent sagging of the floor and frame members.

4 Claims, 4 Drawing Figures

TRAVEL TRAILER FRAME SUPPORT

SUMMARY OF THE INVENTION

This invention relates to a frame support for a mobile structure, such as a travel trailer.

The mobile structure includes a frame having longitudinal frame members. The frame is supported by axles which in turn mount a wheel at each of their ends for rolling support of the mobile structure. The structure includes side and end walls mounted to the frame, and a roof structure supported by the side and end walls. The axles of such mobile structures are usually located generally intermediate of the length of the longitudinal frame members, thereby producing a cantilevered frame supporting effect about the axles. The forward end of the mobile structure, however, is usually supported by a towing vehicle. The rearward end of the mobile structure is not supported and may be subject to sagging, especially when additional weight is placed on the rear end of the frame, such as by the addition of a slideout room.

It is, therefore, the intention of this invention to provide a mobile structure frame which does not sag about its axle support. One or more tensioning straps are secured each at one end to the rear end of the mobile structure frame or floor and extend upward along the roof structure toward the front end of the mobile structure. Each strap is secured at its opposite end to the structure and supports the frame against sagging.

Accordingly, it is an object of this invention to provide a novel and useful way of preventing sagging of the frame of a mobile structure.

Another object of this invention is to provide a novel and useful frame support for a mobile structure which prevents sagging of the frame when it carries excess weight, such as a slideout room, at one of its ends.

Another object of this invention is to provide a frame support for a mobile structure which is light in weight and easily attached.

Other objects of this invention will become apparent upon a reading of the following description.

DESCRIPTION OF THE PREFERRED EMBODIMENT

Figure 1:
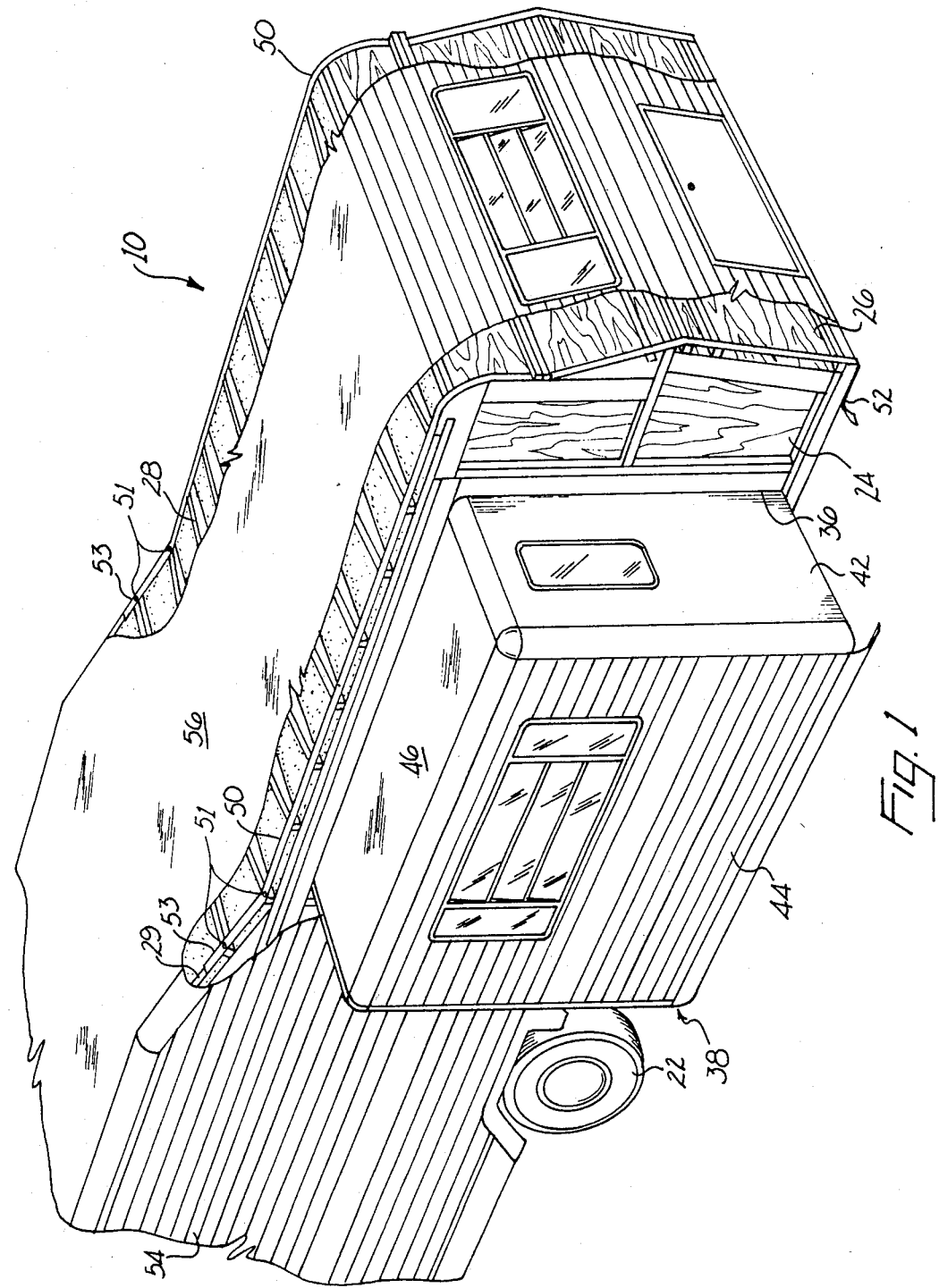
FIG. 1 is a partial perspective view of a travel trailer with portions broken away to illustrate the frame support and showing an extended side room.
Figure 2:
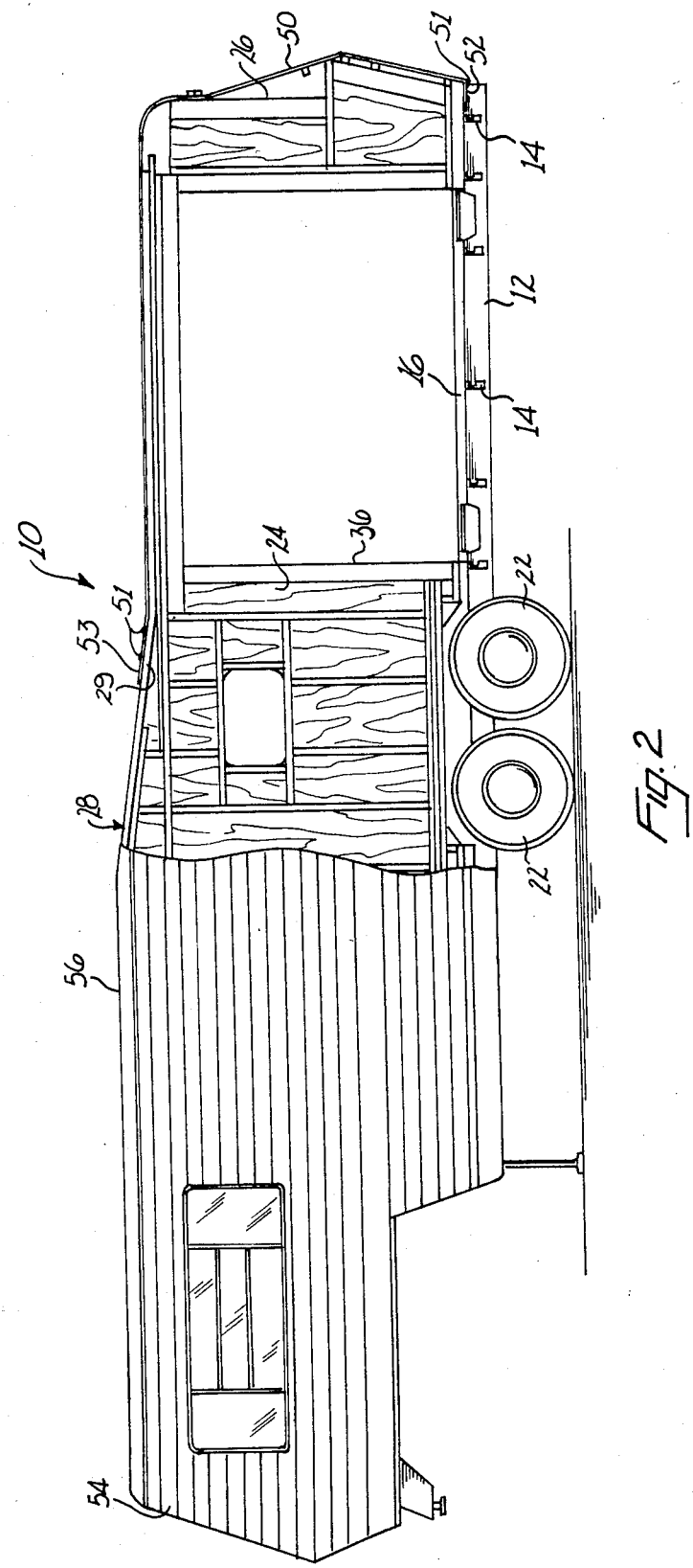
FIG. 2 is a side view of the travel trailer with the side room removed and portions broken away for purposes of illustration.

The preferred embodiment illustrated is not intended to be exhaustive or to limit the invention to the precise form disclosed. It is chosen and described in order to explain the principles of the invention and its application and practical use to thereby enable others skilled in the art to utilize the invention.

This invention includes a mobile structure 10, such as a travel trailer, which includes longitudinal frame members 12. Outriggers 14 project laterally outwardly from the outer side faces of frame members 12. A floor structure 16 is supported upon frame members 12 and outriggers 14 and is secured to the outriggers with bolts 18, or other fastening devices, which pass through the floor structure and into the outriggers. Longitudinal frame members 12 mount axles 20 which in turn journal wheels 22 for rolling transportation of mobile structure 10. Side walls 24 and end walls 26 are supported upon frame members 12 and outriggers 14. A roof 28 is supported by side walls 24 and end walls 26.

Figure 3:
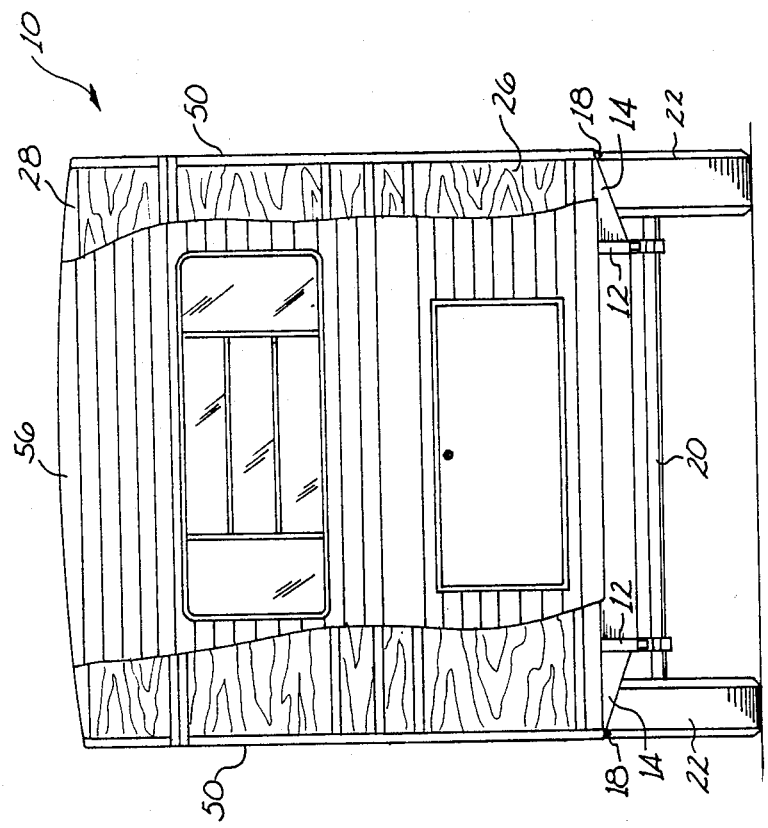
FIG. 3 is a rear end view of the travel trailer with portions broken away to illustrate the frame support.
Figure 4:
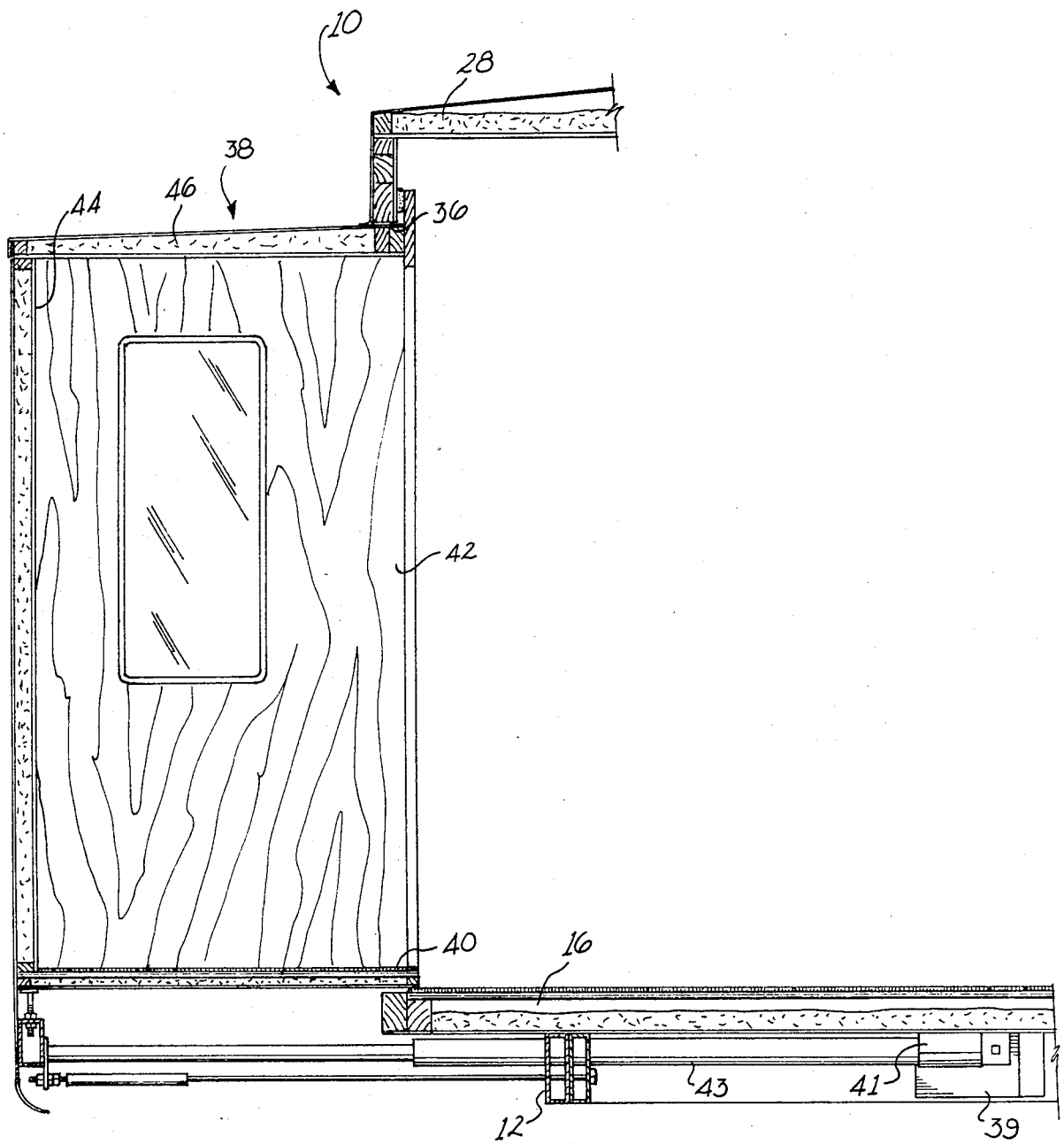
FIG. 4 is a fragmentary sectional view taken along line 4—4 of FIG. 1.

One side wall 24 has an opening 36 formed therein rearwardly of axles 20. Side wall opening 36 is adapted to accommodate a slideout room 38 which includes a floor 40, side walls 42, end wall 44, and a roof 46. Shifting of slideout room 38 between its retracted, or travel position shown in FIG. 3, and its extended, or set up position, shown in FIGS. 1 and 4, is accomplished with an electric motor 39 connected through a gearbox 41 to telescopic extension members 43 which, in turn, are connected to the slideout room.

Slideout room 38, when it is located rearwardly of axle 20 places additional weight on longitudinal frame members 12 which may cause the frame members to sag at the rear end of the trailer. The frame support of this invention is intended to prevent or reduce such sagging of longitudinal frame members 12. The frame support includes flexible stretch resistant straps 50, which are preferably formed of steel having a width of approximately one and one quarter inches. Each strap 50 is connected with screws 51 or similar fasteners at an end portion 52 to the underside and at a rearward lateral edge of floor structure 16. Each strap 50 continues from its end portion 52 upwardly along the rear end of a side wall 24 from where it extends in tension forwardly along roof 28 and is connected by screws 51 or similar fasteners at its opposite end portion 53 forwardly of trailer side wall opening 36 and preferably at least over axles 20 to the frame 29 of roof 28. If desired, each strap 50 may be tacked or anchored at spaced locations between its end portions to roof frame 29.

Straps 50 are applied to mobile structure 10 in the above mentioned fashion before slideout room 38 is added in order to place the straps in tension and cause longitudinal frame members 12 to be slightly cambered so that when the slideout room is added it will be supported without appreciable sagging of the frame members. Subsequent to the assembly of the frame support to mobile structure 10, siding 54 and roof skin 56 are added to the mobile structure.

It is to be understood that the invention is not to be limited by the terms of the above description, but may be modified within the scope of the appended claims.

I claim:

1. In combination, a mobile structure and a frame support for said mobile structure, said mobile structure including a longitudinal frame, an axle attached in said frame and carrying wheels, a floor secured to said frame, side walls and end walls extending upwardly from said floor, one of said side walls having an opening formed therein rearwardly of said axle, a roof overlying said end walls and side walls, a slideout room fitting in said side wall opening, and being shiftable between extended and retracted positions, said frame support including a strap secured at one end portion to one of said floor and frame and continuing in tension rearwardly of said side wall opening upwardly along one of said end walls and forwardly along said roof, said strap secured at its other end to said roof.

2. The combination of claim 1 wherein said strap is tacked along its length to said one end wall and said roof.

3. The combination of claim 1 wherein said frame support includes a second strap secured at one end portion to said one floor or frame and continuing in tension rearwardly of said side wall opening upwardly along said one end wall and forwardly along said roof, said second strap secured at its other end to said roof, said first mentioned and second straps being spaced apart.

4. The combination of claim 3 wherein said straps extend along opposite sides of said mobile structure.

* * * * *